United States Patent [19]
Griffen

[11] Patent Number: 4,799,558
[45] Date of Patent: Jan. 24, 1989

[54] DIGITAL LOAD SHIFT COMPENSATION
[75] Inventor: Neil C. Griffen, Westerville, Ohio
[73] Assignee: Toledo Scale Corporation, Worthington, Ohio
[21] Appl. No.: 61,273
[22] Filed: Jun. 12, 1987
[51] Int. Cl.⁴ .................. G01G 19/40; G01G 3/14; G01G 21/24
[52] U.S. Cl. .................. 177/25.14; 177/211; 177/255
[58] Field of Search ............. 177/25.14, 211, 255
[56] References Cited
U.S. PATENT DOCUMENTS
4,380,175  4/1983  Griffen ..................... 177/211 X
4,401,173  8/1983  Komoto .................... 177/255 X Primary Examiner—George H. Miller, Jr.

[57] ABSTRACT

A digital weighing scale is compensated for the effects of off-center loading by determining the position of the load and calculating a corrected weight value according to such position. Position sensing transducers are mounted on the load cell to provide information regarding the position of the load on the weighing scale. An expression for corrected weight as a function of load position and magnitude is determined for the particular scale and stored. The expression is used to calculate corrected weight according to the magnitude and position of each weight placed on the scale. The load cell may include a counterforce of substantially any type including single bending beam, dual bending beam or capacitive structure, and the load magnitude and position sensors may be of substantially any type including strain gages and capacitive sensors.

21 Claims, 10 Drawing Sheets

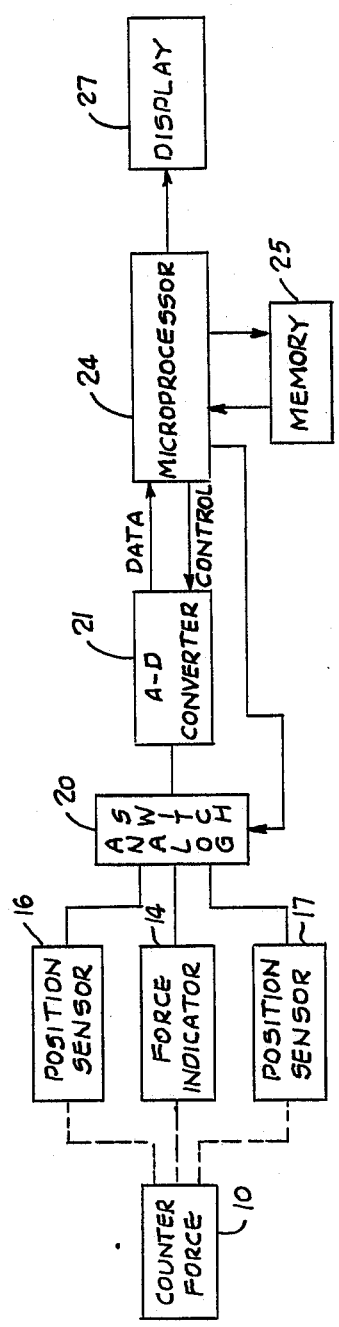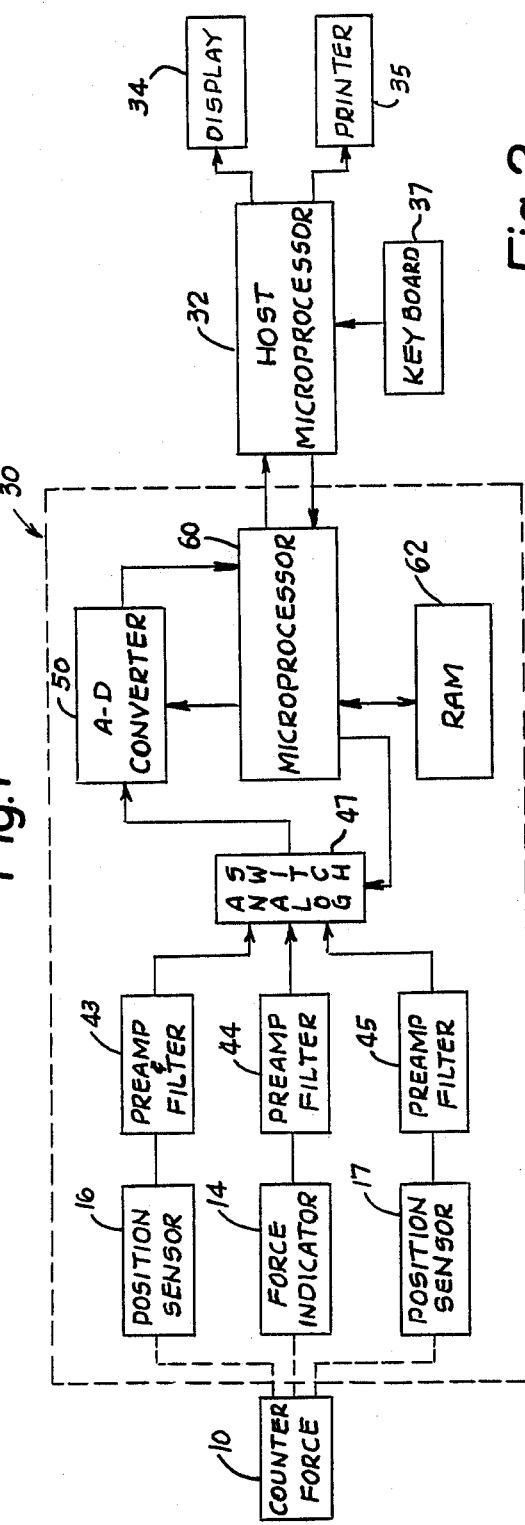

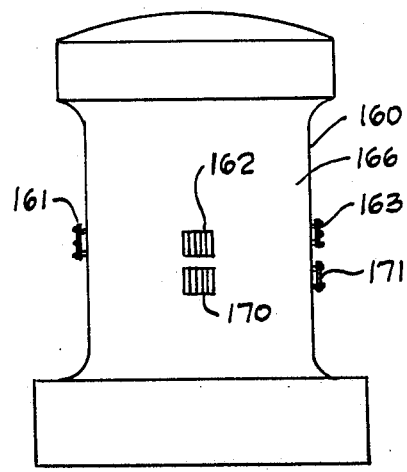
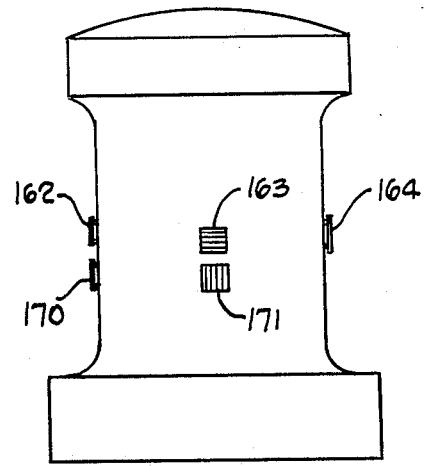
Fig. 10    Fig. 11
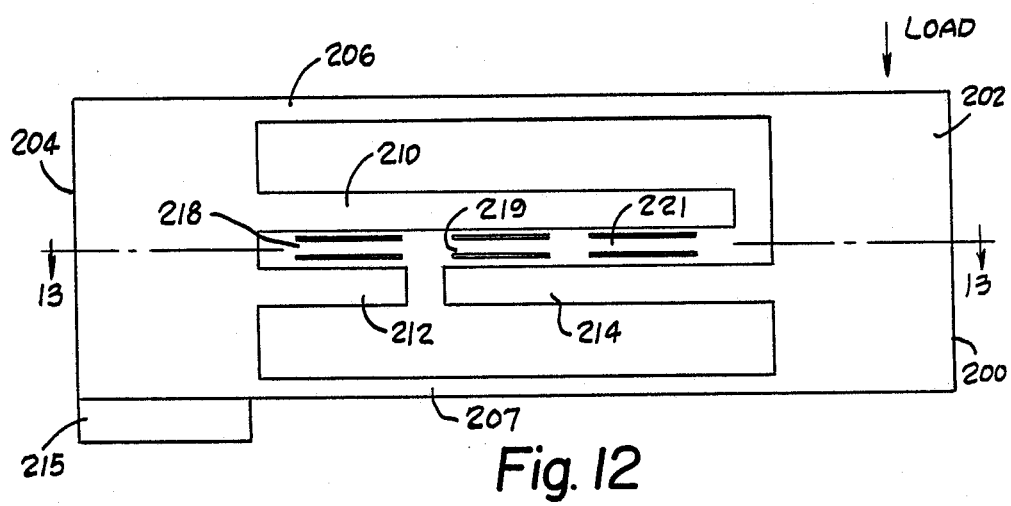
Fig. 12
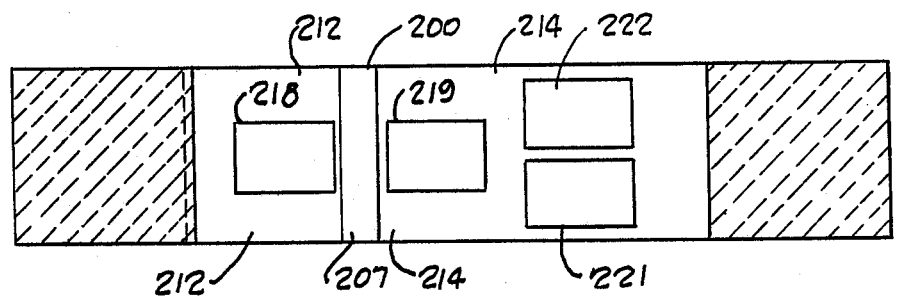
Fig. 13

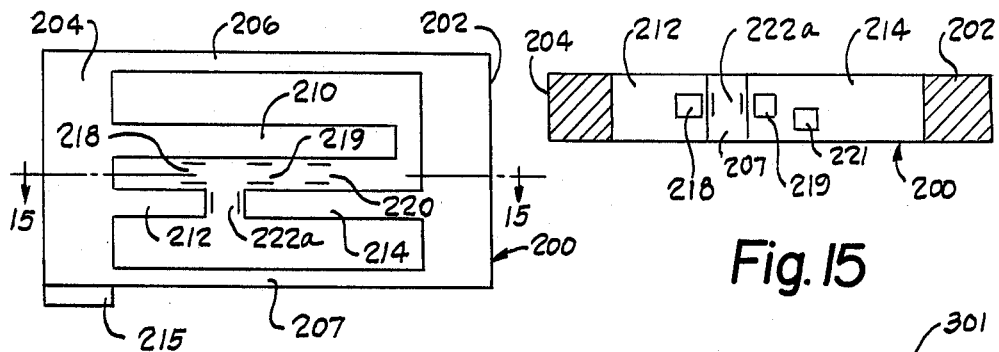
Fig. 14
Fig. 15
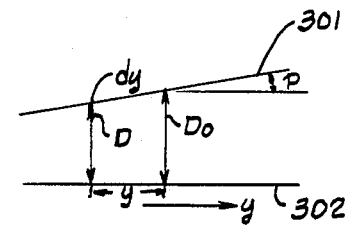
Fig. 18
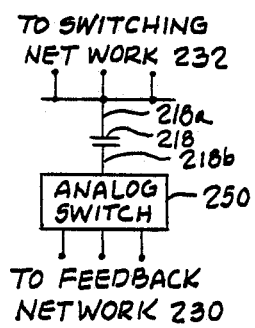
Fig. 17
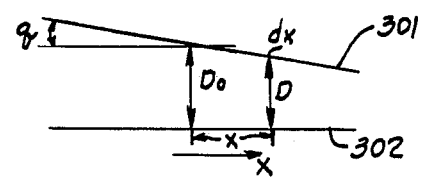
Fig. 19
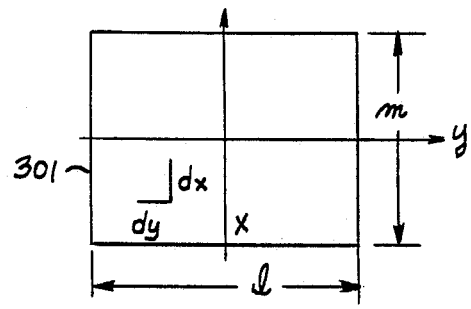
Fig. 20
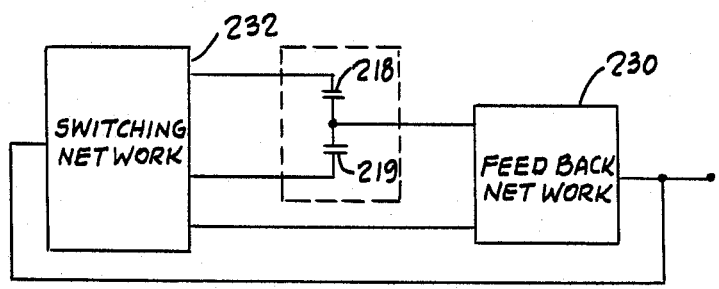
Fig. 16

Fig. 21
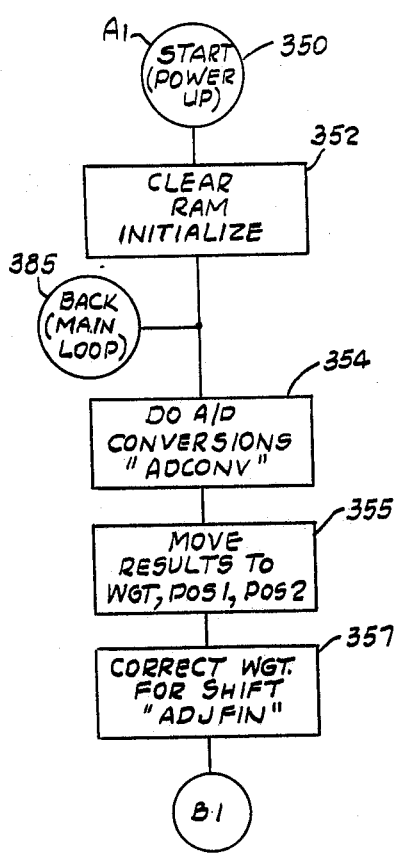
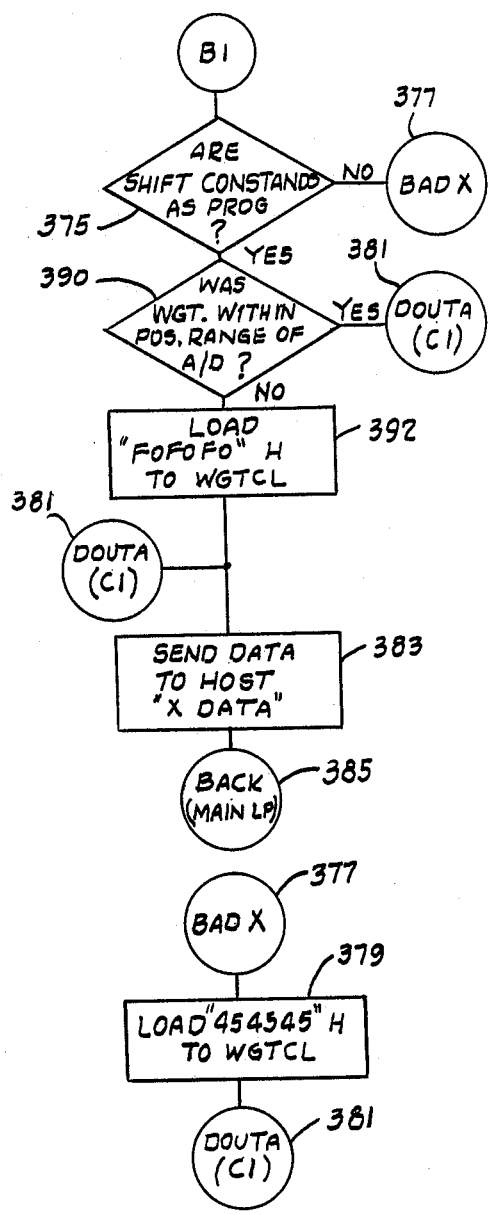

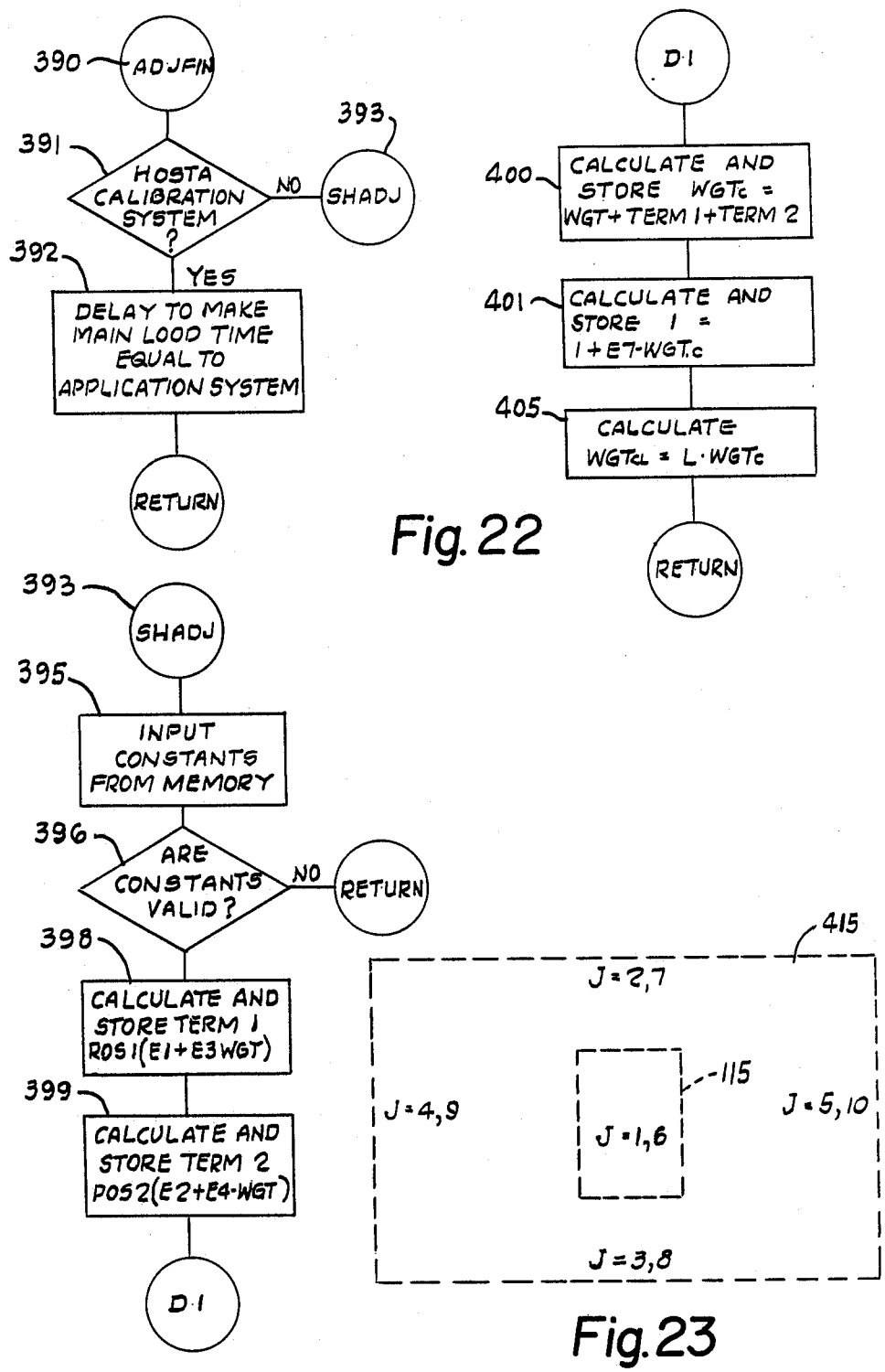

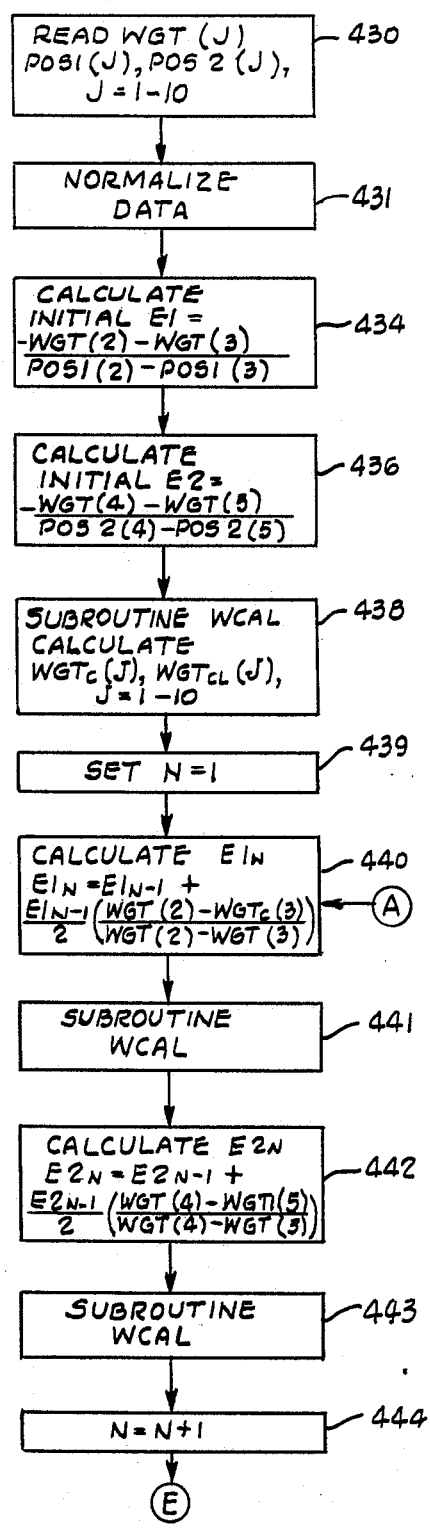
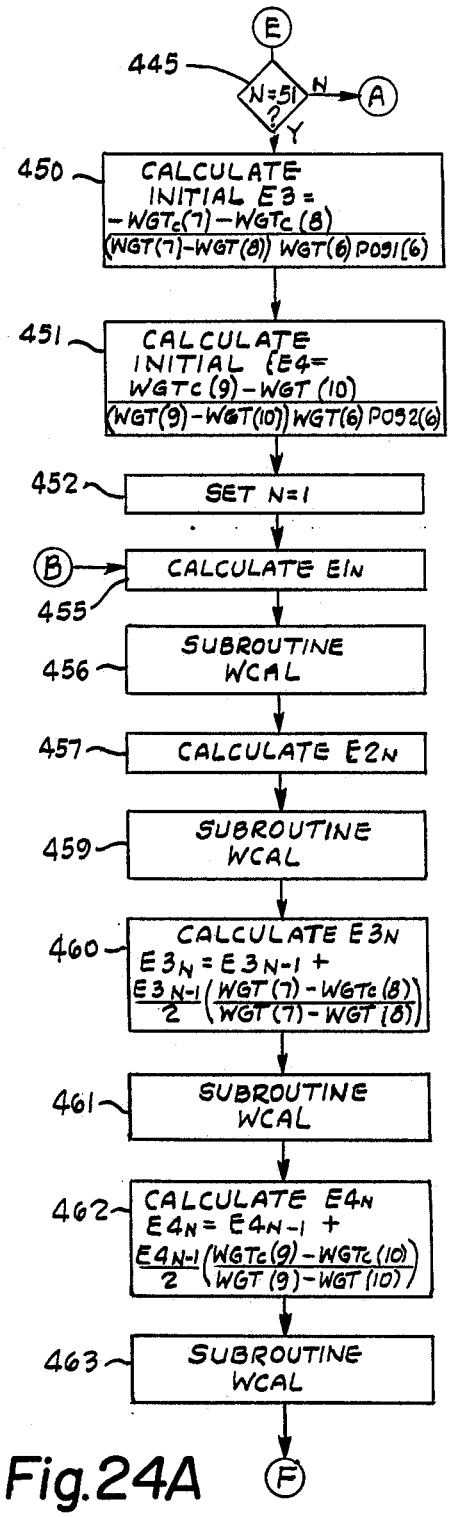
Fig. 24A

DIGITAL LOAD SHIFT COMPENSATION

BACKGROUND OF THE INVENTION

This invention relates to force-measuring apparatus such as a weighing scale and more particularly to force-measuring apparatus compensated for the position of the load on the apparatus.

It is well known that differences in load position on weighing scales reduces the accuracy of weighing measurements and must be more or less compensated in accordance with the required accuracy of the weighing apparatus. In moment-insensitive single load cell scales where the weight-receiving platter and the base support are attached directly to the load cell the effect of load position differences is reduced by the design of the load cell itself. Such a load cell typically includes a load responsive spring element, or counterforce, and strain gages mounted on the counterforce and connected together in an electrical bridge circuit. The load cell is usually designed so that (1) a change in resistance of one strain gage caused by a change in the position of the load is accompanied by a change in the resistance of the other gages such that the output of the bridge circuit tends to remain unchanged and/or (2) the strain gages are positioned in areas or in directions that cause them to be relatively insensitive to changes in the position of the load. A dual beam moment insensitive load cell with the strain gages centered on and parallel to the central axis of the beams employs both these techniques.

Further reduction of load position errors is usually required and has been accomplished in several different ways. One technique involves honing of the counterforce to slightly alter the geometry of the load cell. This technique produces improvements but is very laborious and time consuming.

Another technique, suggested in U.S. Pat. No. 3,576,128 to Lockery, involves the use of compensating resistors connected to the strain gages. A similar but considerably improved technique was suggested in U.S. Pat. Nos. 4,380,175 and 4,453,609 Griffen and Griffen et al, respectively. Substantially improved results were obtained with a significant reduction in labor by positioning of the strain gages in certain ways combined with the use of compensating resistors in circuit with certain of the strain gages.

In U.S. Pat. No. 4,482,022 Komoto, a force-measuring transducer is calibrated for a center loading position and auxilary transducers are provided for detecting displacement of the load from the center calibrated position. The outputs of the auxilary transducers are employed to adjust the gain of the force measuring transducer to correct for any detected displacement from the calibrated position.

SUMMARY OF THE INVENTION

According to the present invention, one or more additional sensors are provided on the counterforce to determine the position of the load along at least one of two mutually transverse axes. The output(s) from the position sensor(s) are provided along with the weight indications from the force-measuring transducer to a microcomputer. An algorithm is employed to calculate a corrected weight that has the same value for the same or an equal load applied at any position along one or both axes on the weighing apparatus. The values of the constants required for the algorithm can be determined for each individual load cell by obtaining data as to the load position characteristics of the load cell.

Another advantage of the present invention is that correction for nonlinearities induced by the design of the load cell can be incorporated in the algorithm. This permits changes in the design of the load cell which offer certain efficiencies and advantages but which tend to introduce nonlinearities. For example, in a dual beam counterforce employing strain gages all of the strain gages may be mounted on the top surface of the counterforce for ease of assembly and construction despite nonlinearities introduced when the gages are so mounted.

BRIEF DESCRIPTION OF THE DRAWINGS

FIG. 1 is a block diagram of apparatus embodying the present invention;

FIG. 2 is a block diagram, in greater detail than that of FIG. 1, of a preferred form of weighing apparatus embodying the present invention;

FIGS. 9A to 9C are bridge circuits incorporating the longitudinal position-sensing strain gages, the transverse position-sensing strain gages and the force measuring strain gages, respectively, of the load cell of FIG. 8;

FIG. 10 is a front elevational view of a compression beam load cell provided with position sensing strain gages for load shift compensation in accordance with the present invention;

FIG. 11 is a side elevational view of the load cell of FIG. 10;

FIG. 12 is a side elevational view of a load cell counterforce provided with capacitive weight and position sensors for load shift compensation in accordance with the present invention;

FIG. 13 is a horizontal sectional view of the load cell of FIG. 12 on the line 13-13 of FIG. 12;

FIG. 14 is a side elevational view of the counterforce of FIG. 12 with a different arrangement of capacitive sensors;

FIG. 15 is a horizontal sectional view of the load cell of FIG. 14 on the line 15—15 of FIG. 14;

FIG. 16 is a block diagram of a circuit for determining the capacitance of a sensor capacitor, such as those employed in the load cells of FIGS. 12-15;

FIG. 17 is a diagram of a circuit for permitting a single reference capacitor to be used in the circuit of FIG. 16 for determining the capacitance of 3 sensing capacitors;

FIG. 18 is a front elevational view of a capacitor illustrating the relative effect on the plates of off-center loading;

FIG. 19 is a side elevational view of the capacitor of FIG. 18;

FIG. 20 is a top plan view of the capacitor of FIG. 18;

FIG. 21 is a flow chart illustrating the operation of weighing apparatus incorporating the present invention;

FIG. 22 is a flow chart of the load shift correction subroutine in the flow chart of FIG. 21;

FIG. 23 is a top plan view of a weighing scale platter illustrating various load positions that can be used in taking data for determination of correction algorithm constants; and FIGS. 24A to 24C are flow charts of a program for determining the load shift calculation constants for particular weighing apparatus incorporating the present invention.

DESCRIPTION OF THE PREFERRED EMBODIMENTS

Figure 3:
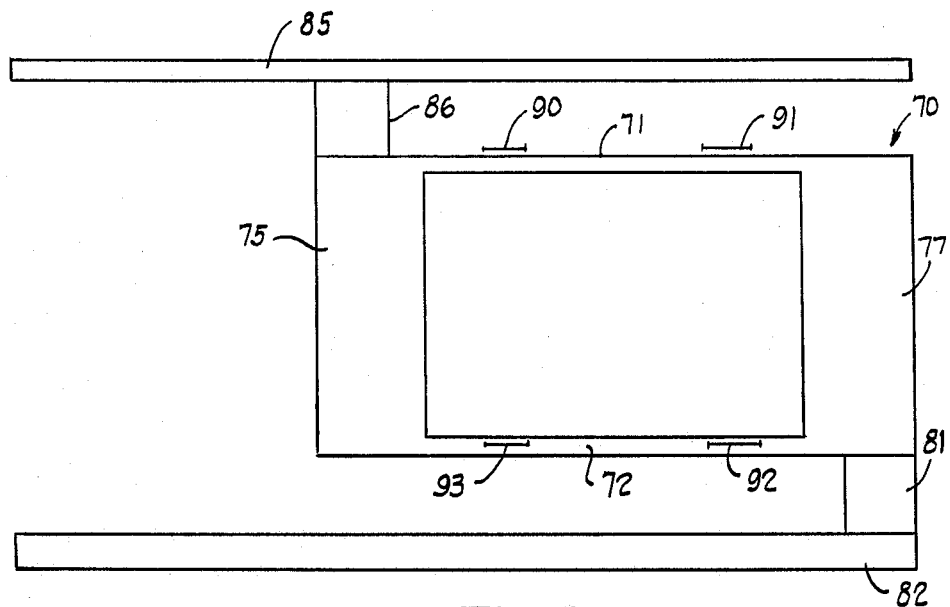
FIG. 3 is a side elevational view of weighing apparatus incorporating a dual beam load cell adapted for load shift compensation in accordance with the present invention.

As shown in FIG. 1, an electronic weighing scale embodying the present invention includes a load cell counterforce 10. The counterforce 10 may be of substantially any type which deflects in proportion to the magnitude of the load applied to it and which deflection is measured and indicated by appropriate means such as strain gages, capacitive elements and the like. A set of such force indicators is represented by block 14. The output of force indicator 14 will change to some extent with changes in the position of the same load applied to counterforce 10. Position sensing elements 16, 17 provide information as to the position of the load applied to counterforce 10 in two mutually transverse directions. In some cases it could be necessary or desirable to compensate for differences in position of the load in only one direction. In those cases a position sensing element or elements need only be provided to indicate load position in that direction. Position sensors 16, 17 may be essentially any type of sensor capable of measuring deflection in the counterforce, strain gages, for example, or capacitive, piezoelectric or fiber optic elements. The force measurement from force indicator 14 and the position information from sensors 16, 17 are coupled through an analog switch 20 to an analog-to-digital (A/D) converter 21 where the analog signals are converted to digital form and provided to a microcomputer 24. A memory 25 and a display unit 27 are associated with microcomputer 24. Microcomputer 24 controls analog switch 20 and A/D converter 21 to receive data regarding the magnitude and position of a load on counterforce 10. Microcomputer 24, using information obtained during set-up of the scale and stored in memory 25, employs the load magnitude and position information to produce a weight indication corrected for load position variations and causes the corrected weight to be displayed on display unit 27. The manner in which this is accomplished will be described more fully below.

Referring now to FIG. 2, a preferred form of weighing apparatus incorporating the present invention includes a "digital load cell" generally designated 30 interfaced with a "host" or scale system microcomputer 32. Along with other functions, microcomputer 32 controls a display 34 and a printer 35 and receives operator information through a keyboard 37. The weighing system of FIG. 2 differs from the more typical arrangement of FIG. 1 primarily in that various electronic circuits have been combined on the same printed circuit board with the A-D converter and a dedicated load cell microprocessor and memory added. The result is the digital load cell which may be calibrated, compensated and corrected as a unit in itself and incorporated into a variety of microcomputer controlled scale systems. When so incorporated the digital load cell is interfaced with the scale or host microcomputer, such as microcomputer 32 in FIG. 2.

In the form shown in FIG. 2, digital load cell 30 includes many of the same elements as FIG. 1. Force indicator 14 and position sensors 16, 17 provide analog signals to respective sets of preamplifiers and filters 43 to 45 and then through an electronic switch 47 to an A-D converter 50. The A-D converter is preferably of the triple slope integrating type. Operation of the digital load cell is controlled by a programmed microprocessor 60 and associated nonvolatile RAM memory 62. Suitable microprocessors are INTEL Models 8049 and 8051.

In addition to controlling the operation of digital load cell 30, microprocessor 60 with RAM 62 operates on the weight data from A-D converter 50 to compensate for the effects of load position in accordance with the present invention. The microprocessor also communicates with host microcomputer 32, and transmits thereto weight data which may be further processed by the host microcomputer and displayed on display device 34.

Figure 4:
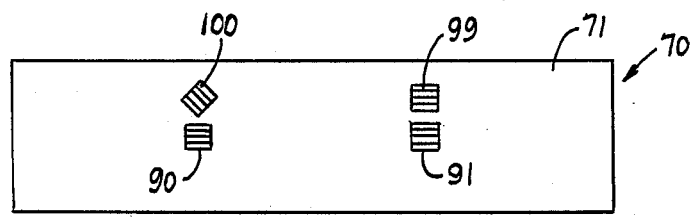
FIG. 4 is a top plan view of only the load cell of FIG. 3.
Figure 5:
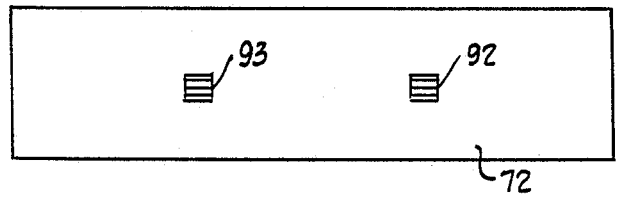
FIG. 5 is a bottom plan view of only the load cell of FIG. 3.

Referring now to FIGS. 3, 4 and 5, there is shown a dual beam counterforce generally designated 70 having an upper beam 71 and a lower beam 72. Beams 71, 72 are rigidly connected at one end by vertical member 75 and at the other end by vertical member 77. Counterforce 70 is connected at one end through a rigid spacer member 81 to a support base 82. The other end of counterforce 70 supports a weight receiving platter 85 through a rigid spacer member 86. A set of force measuring strain gages 90 to 93 are mounted on counterforce 70 in a conventional manner. Strain gages 90 and 91 are mounted on the top surface of upper beam 71 aligned with and centered on the central longitudinal axis of beam 71 while strain gages 92 and 93 are mounted on the bottom surface of lower beam 72 with the same orientation as gages 90, 91.

The arrangement of FIGS. 3 to 5 as thus far described is a conventional weighing scale employing a dual beam load cell. Strain gages 90 to 93 may be connected in an electrical bridge circuit to provide an electrical analog output representing the weight of an object placed on weight receiving platter 85. Typically, the analog output of the bridge circuit will be applied through an A/D converter to a display to provide a digital representation of the weight of the object on platter 85. The weighing scale thus far described would also suffer more or less from the effects of different positions of the load on platter 85, that is, changes in placement of the same load on platter 85 would result in changes in the output from strain gages 90 to 93. The scale would thus require further compensation for load position differences which could be provided in one of the ways discussed above.

In accordance with the present invention, as shown in FIG. 4, an additional pair of strain gages 99, 100 is mounted on the top surface of upper beam 71. Strain gage 99 is positioned to one side of strain gage 91 and has its strain sensing elements oriented parallel to the longitudinal axis of beam 71 so that it is sensitive to load positions along or parallel to the longitudinal axis of beam 71. Strain gage 100 is positioned laterally to one side of strain gage 90 and has its strain sensing elements oriented at an angle to the longitudinal axis of beam 71 so that it is sensitive to load positions perpendicular to the longitudinal axis of the beam. The angle of gage 100 may range from a few degrees to ninety degrees to achieve a desired level of output from the gage in particular applications. Strain gage 99 provides, for a given load, output signals which differ according to changes in load position in the longitudinal direction. Similarly, gage 100 provides, for a given load, output signals which differ according to changes in position of the load in directions transverse to the longitudinal axis of beam 71. Together, gages 99, 100 provide information indicating the effect of different load positions on platter 85 which can be combined with information from force-measuring strain gages 90 to 93 to provide a weight indication that is correct for any load position.

Figure 6:
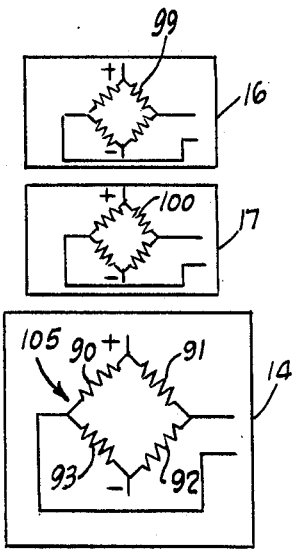
FIG. 6 is a schematic diagram of the position sensing and force measuring strain gages of FIGS. 3 to 5.

Position sensing strain gages 99 and 100 and force-measuring strain gages 90 to 93 may be connected in the block diagram of FIG. 1 or of FIG. 2 in the manner shown in FIG. 6. Force-measuring strain gages 90 to 93 are arranged in an electrical bridge circuit 105 in the conventional manner. The output of bridge circuit 105 is connected through preamp 44 to analog switch 47 in FIG. 2 or directly to analog switch 47 in FIG. 1. Longitudinal position strain gage 99 and transverse position strain gage 100 are each connected in a bridge circuit with three fixed resistors. Since the gages 99, 100 are the only active elements in the respective bridge circuits, the bridge circuit outputs indicate the outputs or change in resistance of the respective gages. The output of each bridge circuit is connected through preamps 43, 45 to analog switch 47 in FIG. 2 or directly to analog switch 20 in FIG. 1.

In the scale of FIGS. 1 to 6, when the same weight is placed at the same spot on platter 85 at different times the weight signal from bridge circuit 105 will be the same. When, however, the weight is placed in a different position the output signal of bridge circuit 105 may increase, decrease or remain the same depending on the direction and magnitude of the displacement of the weight. The output difference introduced by displacement of the weight in any particular direction on platter 105 is approximately proportional to the magnitude of the displacement and the weight of the object. That is, $$\text{Difference} = A*\text{weight}*\text{displacement} \tag{1}$$

where A is a constant and a function of direction. By determining the differences for any two nonparallel directions, such as along the longitudinal axes of beams 33, 34 and at right angles thereto, the difference can be determined for any position on platter 85. The total difference can usually be considered the sum of the differences for the two nonparallel directions. Thus, the difference, or load shift error, can be determined if the displacement and magnitude of the load are known along with the load shift characteristics of the particular load cell. Position sensing gages 99 and 100 provide signals proportional to both magnitude and displacement of the load. The information from gages 99 and 100 and from bridge circuit 105 enables microcomputer 24 (FIG. 1) or microprocessor 60 (FIG. 2) to correct the output of bridge circuit 105 for load shift errors.

An algorithm providing a weight reading corrected for load shift in any one direction, for example, the longitudinal direction, includes the uncorrected reading plus a correction term for shift in that direction. The correction term must, as indicated by equation (1), take into account both the magnitude of the weight and its displacement in the appropriate direction. Position sensing gages 99 and 100 provide readings which meet these criteria for the longitudinal and transverse directions, respectively. The sum of the correction terms for the two directions plus the uncorrected reading yields a weight reading corrected for load position differences in all directions.

Thus, a simple form of algorithm for correcting the load shift error is $$CR = A*RR + B*LG + C*TG \tag{2}$$

where
CR is the weight corrected for load position,
RR is the uncorrected weight,
LG is the reading of the longitudinal position sensing gage (99),
TG is the reading of the transverse position sensing gage (100), and
A, B, and C are constants having values that depend upon the individual load cell.

In practice, longitudinal position sensing gage 99 will produce an output signal with the load centered on platter 85 as the reference position while transverse gage 100 may or may not depending on its angle of orientation. The meaningful value for both longitudinal gage 99 and transverse gage 100 is the difference between its output reading with the load displaced in the corresponding direction and the load at the initial, or reference, position. In equation (2) use of the coefficient A for the uncorrected weight with a value not equal to one takes into account reference position readings not equal to zero for one or both position gages.

Figure 7:
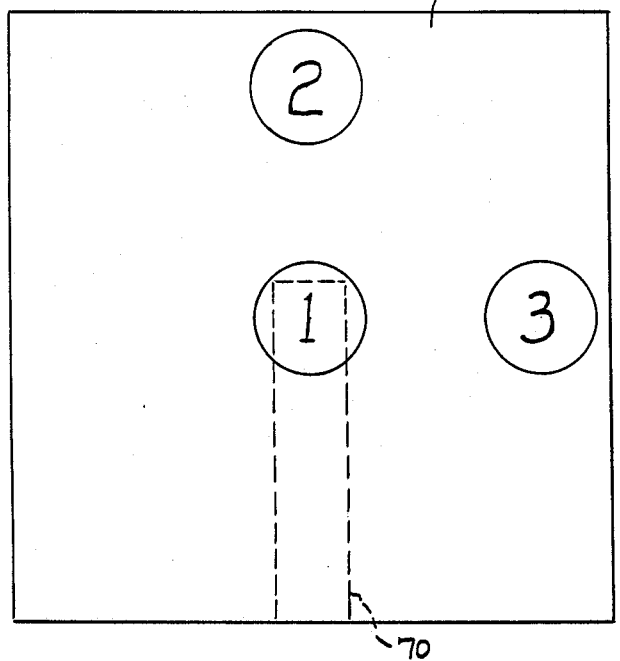
FIG. 7 is a top plan view of the weighing apparatus of FIG. 3 illustrating certain center and off-center loading positions.

The values of the constants A, B, C for each individual load cell may be determined after the load cell is constructed and assembled. A known weight is placed at various positions on the load receiving plotter and readings are taken at each load position from weight indicating bridge 105, longitudinal position sensing gage 99 and transverse position sensing gage 100. The data so taken can be used to determine the values of the constants A, B, C for the individual load cell. FIG. 7 and Table 1 below illustrate this procedure for an idealized case.

As shown in FIG. 7, a known weight is placed at position 1 in the center of platter 85. Readings in the form of digital counts are taken for bridge 105, longitudinal position sensing gage 99 and transverse position sensing gage 100 and recorded in the appropriate column of Table 1 as position 1 readings.

TABLE 1

| POSITION | BRIDGE 105 | LG GAGE 99 | TG GAGE 100 |
|---|---|---|---|
| 1 | 100,000 | 30,000 | 0 |
| 2 | 100,100 | 35,000 | 0 |
| 3 | 100,075 | 30,000 | 20,000 |

The same weight is then shifted to another position, in this example position 2, where the weight is displaced in the longitudinal direction, and the same readings are taken and recorded in Table 1. The weight is then moved to position 3 where it is transversely displaced and the same readings are recorded in Table 1. The readings for each of positions 1, 2 and 3 may then be inserted into equation (2) above resulting in three equations in three unknowns, A, B and C. Solving the equations with the example reading values given in Table 1 produces values of

A = 1.00604
B = −0.0201207
C = −0.00377264

Equation (2) above and the determined values for constants A, B and C for the particular load cell can be stored in memory 25 (FIG. 1) or RAM 62 (FIG. 2) and used to correct each weight reading for load position during operation of the weighing scale.

This invention has been described above in terms of a dual beam counterforce employing four strain gages for force measurement and a single strain gage for each of longitudinal and transverse load position sensing. It will be appreciated, however, that the invention is equally applicable to essentially any type of counterforce, including single beams, shear beams, compression cells and other configurations, and that other types of force measuring and/or position sensing elements and arrangements may be employed. For example, multiple strain gages connected in a bridge arrangement may be used for longitudinal and/or transverse position sensing. Also, other types of transducers such as variable capacitance transducers, may be used as force measuring and/or position sensing elements. Further, other forms of algorithm from that shown above may be employed to achieve more precise load shift correction and to correct for other errors in addition to load position errors.

Figure 8:
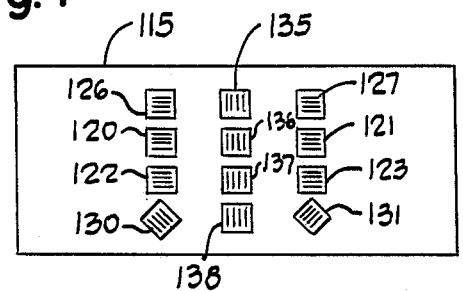
FIG. 8 is a top plan view of a dual beam load cell employing multiple longitudinal and transverse position-sensing strain gages and in which all of the force measuring and position-sensing strain gages are mounted on the surface of the upper load cell beam.
Figures 9A, 9C:
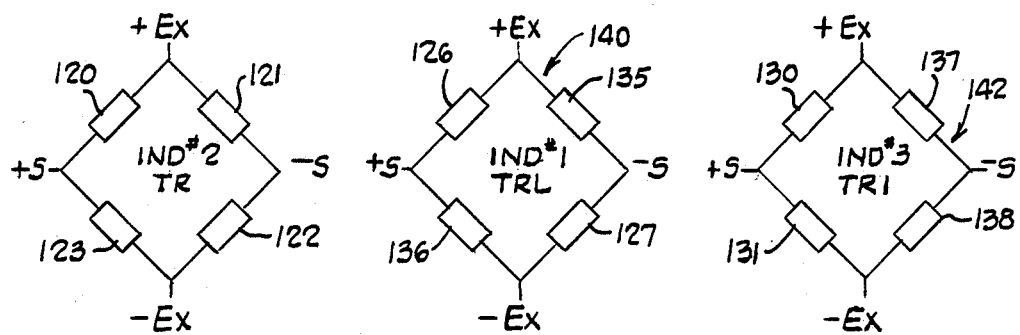

A somewhat more elaborate load cell arrangement offering certain advantages is shown in FIGS. 8–10. In FIG. 8, the upper beam 115 of a dual beam counterforce, which may be identical to counterforce 70 in FIG. 3, is provided with 12 strain gages, all mounted on its top surface. Force measuring strain gages 120, 121, 122 and 123 all are mounted on the top surface of upper beam 115 symmetrically about the longitudinal central axis of the beam rather than two of the gages being mounted on the top surface of upper beam 115 and two of the gages being mounted on the bottom surface of the lower beam (not shown) as in FIGS. 3 to 5. The force measuring gages 120 to 123 are connected in the bridge circuit 124 of FIG. 9A.

Certain advantages are obtained by positioning all of the force measuring strain gages 120 to 123 on the same beam surface. A principal advantage is ease of application of the strain gages to the beam, reducing both labor and cost. A disadvantage, however, of such placement is that load shift errors appear as nonlinear functions of the applied weight. Thus, a shift compensation performed for half load conditions will produce poor results at full load or a linearity test performed by placing weights in the center of the scale platter will yield significantly different results from a linearity test performed by placing weights off center on the platter. The nonlinearities are a function of the longitudinal position of the weight and are thought to be caused by deformation of the load cell. The nonlinearity effects tend to cancel when strain gages are positioned on both the top and bottom beams but not when all the force measuring gages are on one beam surface. Since these nonlinearity errors are a function of the longitudinal position of the weight an accurate determination of the error can be obtained when both the magnitude and position of the weight are known. The arrangement of FIG. 8, then, is correctible for both load shift errors and position nonlinearities according to the present invention.

A pair of longitudinal position sensing gages 120, 127 are mounted on the top surface of upper beam 115 with their strain sensing elements oriented to be sensitive to load position changes in the longitudinal direction. A pair of transverse position sensing strain gages 130, 131 are also mounted on the top surface of upper beam 115 with their strain sensing elements oriented to be sensitive to load position changes in directions transverse to the longitudinal central axis of beam 115. Four inactive or "dummy" strain gages 135 to 138 are mounted between the longitudinally spaced active strain gages with their strain sensing elements oriented at right angles to the longitudinal central axis of beam 115.

Longitudinal position sensing gages 126 and 127 are connected in the bridge circuit 140 of FIG. 9B with inactive gages 135 and 136. Transverse position sensing gages 130 and 131 are connected in the bridge circuit 142 of FIG. 9C with inactive gages 137 and 138. The sole purpose of inactive gages 135 and 136 in the bridge circuit 140 of FIG. 9B and of inactive gages 137 and 138 in bridge circuit 142 of FIG. 9C is to complete the respective bridge circuits. Active gages could be used in place of the inactive gages to increase the bridge sensitivity, if desired.

In accordance with the present invention, each weight reading from the force measuring bridge 124 may be corrected for both load shift and nonlinearity errors by combining it with various correction terms which are dependent upon the readings from longitudinal position sensing bridge 140 of FIG. 9B and transverse position sensing bridge 142 of FIG. 9C and the characteristics of the specific load cell itself. One suitable expression for calculating such a corrected weight indication is as follows:

$$CW = CR*L \qquad (3)$$

where $$CR = RR + LG[E1 + E3*RR + E5*RR^2] + TG[E2 + E4*R-R + E6*RR^2] \qquad (4)$$

and $$L = 1 + E7*CR + 8E*CR^2 \qquad (5)$$

where
  CW = weight indication corrected for load position and linearity,
  L = linearity correction factor,
  CR, RR, LG and TG have the same meanings as in equation (2), LG and TG being the readings of the bridges 140, 142, and
  E1 to E8 are constants.

In most cases sufficient accuracy can be obtained from Equations (4) and (5) with E5, E6 and E8 defined as equal to zero. In some cases it will be desirable to utilize the complete forms of the equations.

In the load cell arrangement of FIG. 8, two of the force measuring strain gages 120 to 123 could, of course, be mounted on the lower beam (not shown) of the counterforce as in FIG. 3, substantially eliminating the nonlinearity disadvantage as well as the advantages of mounting all gages on the same beam surface. In that case, the resulting arrangement could be compensated for load position using only equation (4) above.

The values of the coefficients E1 to E8 in Equations (4) and (5) above may be determined for each individual load cell after the load cell is constructed and assembled. Preferably, the values of the coefficients are determined by an iterative process described hereinafter.

FIGS. 10 and 11 show a compression beam load cell 160 having four active, or load sensing, strain gages 161 to 164 mounted on the periphery of counterforce 166 at 90° intervals in a conventional manner. Gages 161 and 163 are tension sensing gages while gages 162 and 164 are compression sensing gages. A pair of position sensing gages 170 and 171 are also mounted on counterforce 166 at 90° intervals to sense the positions of weights on a weight receiving platter (not shown) supported by load cell 160. Position gage 170 is mounted below compression gage 162 to be sensitive to offset positions of a load in a direction parallel to an axis passing through gages 162 and 164. Similarly, gage 171 is sensitive to offset load positions along an axis passing through gages 161, 163. A scale employing the load cell of FIGS. 11 and 12 may be compensated for differences in load position in substantially the same manner as described above in connection with FIGS. 1 to 6. Load sensing strain gages 161 to 164 are, in use, connected in a bridge circuit as the force indicator 14 in FIGS. 1 or 2. Position sensing gages 170, 171 are connected as position sensors 16, 17 in the system of FIGS. 1 or 2 in the same manner as gages 99 and 100 in FIG. 6.

Equation (2), above, may be employed as a load shift compensation algorithm. The values of the coefficients A, B, C in Equation (2) for individual compression load cells may be determined after the load cell is constructed and assembled in the same manner as described for FIGS. 1 to 6 above. A known weight is placed at various positions on a platter supported by load cell 160 and readings are taken at each position from a weight indicating bridge comprising gages 161 to 164 and from position sensing gages 170, 171. The data so taken are recorded in a table like Table 1, above, and the coefficients in Equation (2) determined by, for example, solving simultaneous equations developed from the data listed in the table. The load shift compensation algorithm, such as Equation (2) above, and the values determined for constants A, B, and C for the particular load cell are stored in the associated scale memory, such as memory 25 in FIG. 1 or RAM 62 in FIG. 2, and used to correct each weight reading for load position during operation of the weighing scale.

Referring now to FIGS. 12 and 13, there is shown a counterforce 200 preferably formed from a single block of ceramic but which may be formed of other suitable materials as well. Counterforce 200 is machined to form a load receiving section 202 at one end, a load supporting section 204 at the opposite end and flexures 206 and 207. A first cantilever beam 210 and a second cantilever beam 212 extend from support section 204 toward load receiving section 202. A third cantilever beam 214 extends from load receiving section 202 toward support section 204 and is aligned with beam 212. Support section 204 rests upon a support member 215. The structure acts as a parallelogram linkage so that the load applied to load receiving section 202 will cause it and beam 214 to move downwardly while support section 204 and beams 210 and 212 remain in position until the restoring force due to flexures 206 and 207 equals the applied force. The deflection of load receiving section 202 and beam 214 will then be a measure of the applied force.

Each of beams 210, 212, and 214 is provided with one or more electrodes each forming one plate of parallel plate capacitor 218, 219, 221 or 222. Capacitor 218 is formed between relatively fixed opposing faces of beams 210 and 212 and is, therefore, substantially fixed in capacitance value. Capacitors 219, 221 and 222 are formed between relatively movable faces of beams 210 and 214 so that their capacitance values vary with the deflection of beam 214 and, therefore, with the load applied on load receiving section 202. Fixed capacitor 218 can be used as a reference for variable weight sensing capacitor 219 and, if desired, for variable capacitors 221 and 222. As described below, an analog signal can be obtained proportional to the capacitance of capacitor 219 and, therefore, to the applied load.

Capacitor 219 is centrally located on counterforce 200 so as to minimize its sensitivity to loads being applied at different positions with respect to load receiving section 202. Despite such placement, however, counterforce 200 is susceptible to errors produced by changes in the position of a load applied to the counterforce. In accordance with this invention, the capacitors 221 and 222 are provided to indicate the position of the load so that the output of the load cell can be compensated for different load positions.

Capacitors 221 and 222 are positioned on beams 210 and 214 spaced from capacitor 219 both longitudinally and laterally so as to be more sensitive than capacitor 219 to loads positioned off center on the counterforce. The capacitance value of each capacitor 221, 222 will vary not only with the load applied, but also with the position of the load. This information may be used to provide a weight indication corrected for position.

In FIGS. 14 and 15, load cell 200 of FIGS. 12 and 13 is shown with reference capacitor 218, weight sensing capacitor 219 and position sensing capacitor 221 in the same positions as in FIGS. 12 and 13. Position sensing capacitor 222, however, has been replaced by capacitor 222a having its plates positioned on the opposing vertical faces of beams 212 and 214. In that position, capacitor 222a is more sensitive to load position differences along, as compared to transverse to, the longitudinal axis of load cell 200 than capacitor 222 in FIGS. 12 and 13.

It will be apparent that the capacitors in FIGS. 13 to 16 can be positioned in many ways to accomplish their purpose. It is necessary only that the capacitors can be utilized to provide weight and load position information.

Referring now to FIG. 16 there is shown a circuit arrangement utilizing reference capacitor 218 and weight sensing capacitor 219 to provide an analog signal indicating the magnitude of the load applied to counterforce 200. In the capacitance measurement system of FIG. 16, capacitors 218 and 219 are connected in series with their common terminal connected to one input of a feedback network 230. The remaining terminals of capacitors 218 and 219 are connected to different output terminals of a switching network 232. A third output terminal of switching network 232 is connected to a second input terminal of feedback network 230. The feedback signal from feedback network 230 is connected to the input of switching network 232.

Switching network 232 periodically interconnects the feedback signal and a plurality of reference potentials with capacitors 218 and 219 and feedback network 230 so that the average charge stored on capacitors 218, 219 over each cycle is substantially equal to a predetermined value. The feedback signal generated by feedback network 230 represents the difference between the charge stored on capacitors 218 and 219 and the predetermined value. The feedback signal is thus a predetermined function of the capacitance of variable capacitor 219 which, in turn, is a function of the load applied to counterforce 200. The arrangement of FIG. 16 is described more fully in U.S. Pat. No. 4,054,833 issued Oct. 18, 1977, the disclosure of which is incorporated herein by reference.

Circuits identical to that of FIG. 16 may also be used to provide signals indicating the capacitance value of position sensing capacitors 221 and 222 in FIGS. 12 and 13 or capacitors 221 and 222a in FIGS. 14 and 15. In those cases, either an additional reference capacitor corresponding to reference capacitor 218 must be provided for each position sensing capacitor or the single reference capacitor 218 must be switched into each of the three capacitance detection circuits. In the former case, the additional reference capacitors could be mounted on beam 212 of counterforce 200 in FIG. 13 or FIG. 15 along with reference capacitor 218. In the latter case, as shown in FIG. 17 single reference capacitor 218 has one terminal 218a connected directly to each of the three switching networks 232. The remaining terminal 218b is switched through analog switch 250 to feedback network 230 and the sensing capacitor of each circuit in turn. Analog switch 250 is controlled by microprocessor 24 in FIG. 1 or microprocessor 60 in FIG. 2 to connect common reference capacitor 218 to each capacitance detection circuit in turn as the circuit is connected through analog switch 20 (FIG. 1) or analog switch 47 (FIG. 2) to an A/D converter.

Other circuit arrangements and combinations than shown in FIGS. 16 and 17 may be used to provide signals indicating the capacitance of weight sensing capacitor 219 and position sensing capacitors 221, 222 and 222a. For example, known capacitance detection circuits not employing reference capacitors may be used to obtain all three of the capacitance values in each of FIGS. 12 and 14. Further, the circuit arrangement of FIG. 16 may be employed to indicate the capacitance value of one or more of capacitors 219, 221 and 222 (or 222a) with the remaining capacitance values being determined by a circuit not employing a reference capacitor.

Whatever capacitance detection circuit or circuits are employed would occupy blocks 14, 16 and 17 in the system of FIG. 1 or FIG. 2.

In the capacitive load cell of FIGS. 12 to 15, the capacitance of weight sensing capacitor 219 is directly proportional to the overlapping area of the plates and inversely proportional to the distance between them. Loads applied to the load cell should, ideally, change only the distance between the plates. Loads applied off center, however, produce relative movement of the plates as a function of the position of the load applied. This relative movement can occur as a change in plate separation, a rotation of one plate with respect to the other about an axis parallel to the plates and a movement of one plate with respect to the other in a plane containing the moving plate. The changed or new capacitance of the capacitor can then be expressed as the original or old capacitance plus the capacitance change produced by each of the effects mentioned, that is, $$C \text{ (new)} = C \text{ (old)} + dC_1 + dC_2 + dC_3$$

where,
  $dC_1$ is related to changes in plate separation
  $dC_2$ is related to changes in plate orientation
  $dC_3$ is related to changes in plate positioning
For small changes,
  $dC_1$ is proportional to dS
and,
  $dC_3$ is proportional to dA
where,
  dS is a small change in plate separation, and
  dA is a small change in overlapping area of the plates.

For changes in plate parallelism consider the capacitor 300 of FIGS. 18 to 20 in which upper plate 301 is inclined at angle p in the longitudinal direction and angle q in the transverse direction with respect to lower plate 302. Each plate has a length l and depth m. The centers of the plates are separated by a constant distance Do. If y is the longitudinal axis and x is the transverse axis of capacitor 300, the capacitance $dC_2$ of an area dx by dy at point x, y where the plates are separated by distance D is $$dC_2 = k \frac{dx\,dy}{D}$$

From FIGS. 18 to 20

$$D = D_o\left(1 + y\frac{\tan p}{D_o} + x\frac{\tan q}{D_o}\right)$$

$$= D_o(1 + ax + by)$$

where $a = \frac{\tan q}{D_o}$ and $b = \frac{\tan p}{D_o}$ and, $C_2 = k_o \sum_{ij} \frac{dx_i\,dy_j}{D_o(1 + ax_i + by_j)}$ which can be shown to be $$C_2 = \frac{k_1}{ab} \sum_{n=0}^{\infty} \frac{(-0.5)^{n+2}}{(n+1)^{n+2}} (al + bm)^{n+2} - (al - bm)^{n+2} +$$

$$(-al - bm)^{n+2} - (-al + bm)^{n+2}$$

where l and m are the length and depth of the capacitor plates. Thus, $$C_2 = F\,(a,b,n)$$

The total error can be described as $$dC = dC_1 + dC_2 + dC_3$$

where,
  $dC_1 = f(dS)$, change in plate separation
  $dC_2 = F(da,db)$, change in longitudinal and transverse angles of the plates
  $dC_3 = g(dA)$, change in overlapping area of the plates.

Considering FIGS. 12 to 15, it can be seen that for every position of a weight on a platform supported by the load cell there exists a unique value of a and b. The exact relationship between a, b and weight position will be dependent on the geometry and material of the load cell counterforce and will vary with load cell design.

Further, the separation, S, between the centers of the plates will also be a function of weight position. The change in S, or dS, can be approximated by a function of a and b, as $$dS = E_1 da + E_2 dB$$

and $$S = S_0 + dS = S_0 + E_1 da + E_2 db$$

wherein
$S_0$ is the initial plate separation,
$E_1$ and $E_2$ are constants.
Still further, the change in A, or dA can also be approximated by a function of a and b, as $$dA = E_3 da + E_4 db$$

and, $$A = A_0 + dA = A_0 + E_3 da + E_4 db$$

where,
$A_0$ is the initial overlapping area of the plates,
$E_3$ and $E_4$ are constants.
Combining the above, $$\begin{aligned} dC &= dC_1 + dC_2 + dC_3 = f(dS) + F(da,db) + g(dA) \\ &= E_5 da + E_6 db + F(da,db) + E_7 da + E_8 db \\ &= da(E_5 + E_7) + db(E_6 + E_8) + F(da,db) \\ &= G * da + H * db + F(da,db) \end{aligned}$$

The full form of $F(da,db)$ can be simplified and approximated as, $F(da,db) = I*ABS(da) + J*ABS(db)$ where I and J are constants, so that, $$dC = G*da + H*db + I*ABS(da) + J*ABS(db) \quad (6)$$

Referring again to FIG. 13 along with FIGS. 18 to 20, note that position sensing capacitors 221 and 222 are aligned parallel to a transverse axis corresponding to axis x in FIGS. 19 and 20, and that weight sensing capacitor 219 is spaced from capacitors 221 and 222 along a longitudinal axis corresponding to axis y in FIGS. 18 and 20. A load applied off-center on load cell 200 in the transverse direction would produce a relative inclination of the upper and lower plates of capacitors 221 and 222 at an angle corresponding to angle q in FIG. 17. In that case, tan q, or b, is an approximately linear function of the difference between the capacitances of capacitors 221 and 222. Similarly, for a load offset in the longitudinal direction, tan p, or a, is an approximately linear function of the difference between the sum of the capacitances of capacitors 221 and 222 and twice the capacitance of capacitor 219. Thus, equation (6) above can be rewritten as $$dC = G*(C_{222} - C_{221}) + H*(C_{221} + C_{222} - 2C_{219}) + I*ABS(C_{222} - C_{221}) + J*ABS(C_{221} + C_{222} - 2C_{219}) \quad (7)$$

where $C_n$ are the indicated capacitances of the numbered capacitors.

This expression can be expanded to compensate for nonlinearities and improve the general accuracy by adding higher power terms, as, $$dC_x = G * (C_{222} - C_{221}) + H * (C_{221} + C_{222} - 2C_{219}) + \quad (8)$$
$$I * ABS(C_{222} - C_{221}) + J * ABS(C_{221} + C_{222} - 2C_{219}) +$$
$$K * (C_{222} - C_{221})^2 + L * (C_{221} + C_{222} - 2C_{219})^2 +$$
$$M * [(C_{222} - C_{221})(C_{221} + C_{222} - 2C_{219})] +$$
$$N * ABS[(C_{222} - C_{221})(C_{221} + C_{222} - 2C_{219})]$$

where G-N are constants having values dependent upon the individual load cell and $dC_x$ is dC expanded.

In the arrangement of FIGS. 14 and 15, capacitors 221 and 219 are displaced transversely so that tan q, or b, is an approximately linear function of the difference between the capacitances of capacitors 221 and 219. Capacitors 222a and 219 are displaced longitudinally so that tan p, or a, is an approximately linear function of the difference betwen the capacitances of capacitors 222a and 219. Thus, for the arrangement of FIGS. 14 and 15 equation (6) above can be written as $$dC = G*(C_{221} - C_{219}) + H*(C_{222a} - C_{219}) + I*ABS(C_{221} - C_{219}) + J*ABS(C_{222a} - C_{219}) \quad (7A)$$

This expression can be expanded in the same manner and for the same purpose as equation (8), as $$dC_x = G * (C_{221} - C_{219}) + H * (C_{222a} - C_{219}) + \quad (8A)$$
$$I * ABS(C_{221} - C_{219}) + J * ABS(C_{222a} - C_{219}) +$$
$$K * (C_{221} - C_{219})^2 + L * (C_{222a} - C_{219})^2 +$$
$$M * [(C_{221} - C_{219})(C_{222a} - C_{219})] +$$
$$N * ABS[(C_{221} - C_{219})(C_{222a} - C_{219})]$$

The capacitance value of weight sensing capacitor 219, which corresponds to the weight of an object on the scale, corrected for load position is $$Cc = C_{219} + dC \quad (9)$$

or $Ccx = C_{219} + dCx$ to compensate for nonlinearities.

The values of the constants G-J in equations (7), (7A, or G-N in equations (8), (8A), for an individual load cell may be determined after the load cell is constructed and assembled. Preferably, the values of the constants are determined by an iterative process described hereinafter in the same manner as for constants E1 to E8 in Equations (4) and (5) above.

FIGS. 21 and 22 illustrate the operation of the digital load cell 30 of FIG. 2 under control of microprocessor 60 in correcting weight data to compensate for the effects of load shift in accordance with the present invention. The microprocessor 60 of FIG. 2 is able to communicate with host microcomputer 32 in either a calibration mode or an application mode. Operation in the calibration mode would occur for inputting load shift compensation algorithm constants into the digital load cell. The description following will be of the application mode using as examples Equations (3) to (5) above with constants E5, E6 and E8 equal to zero as the correction algorithm for the load cell of FIG. 8. Initially, it should be noted that the variables in Equation (3) to (5) and the other load shift correction algorithms set forth above can be generalized as follows:

WGT is the uncorrected weight reading from force indicator 14 in FIG. 2;
POS1 is the load position reading from the first position sensor, for example, position sensor 16 in FIG. 2;
POS2 is the load position reading from the second position sensor, for example, position sensor 17 in FIG. 2;

WGT$_C$ is the weight indication corrected for load position by microprocessor 60 in FIG. 2; and WGT$_{CL}$ is the weight indication corrected for load position and linearity.

Equations (3) to (5) written in these generalized terms with E5, E6 and E8 equal to zero are as follows:

$$WGT_C = WGT + POS1(E1 + E3*WGT) + POS2(E2 + E4*WGT) \quad (10)$$

$$L = 1 + E7*WGT_C \quad (11)$$

$$WGT_{CL} = L*WGT_C \quad (12)$$

Equations (10) to (12) are used in the flow charts of FIGS. 21 and 22.

Referring now to FIGS. 21 and 22, after START at block 350 the system is initialized at block 352 to reset all portions of the system to their initial conditions. The output of position sensor 16 and 17 and force indicator 14 in FIG. 2 are read in turn and A/D conversions performed at block 354 through a sub-routine called ADCONV. The weight and position readings resulting from the A/D conversions are moved at block 355 to the appropriate registers. At block 357 WGT is corrected for load position and linearity to produce WGT$_{CL}$ by means of a program subroutine called ADJFIN illustrated in FIG. 22 and described below.

At block 375 the program tests the validity of the constants used in the load shift correction subroutine ADJFIN which are stored in RAM 62 (FIG. 2). If the load shift correction constants are determined to be invalid the program exits through point 377 to block 379 where an "impossible" value is loaded into the WGT$_{CL}$ register to flag invalid data. The program then returns through point 381 to block 383. There, the digital load cell data is transmitted to host microcomputer 32 (FIG. 2) by means of a subroutine identified as X DATA. The program then returns through entry point 385 to the main loop at block 354.

Returning to block 375, if the load shift algorithm constants were determined there to be valid the program continues to block 390 where a check is made to determine if the weight reading obtained at block 354 as later corrected is in the positive range of A/D converter 50 (FIG. 2). If the weight data is determined to be valid the program proceeds to point 381 and to block 383 as described above. If the weight data is determined at block 390 to be invalid the program proceeds to block 392 where an "impossible" value (different from that at block 379) is loaded into the WGT$_{CL}$ register to flag invalid data. The program then proceeds to block 383 as described above.

The procedure for correction of the weight reading for load position and linearity is shown in FIG. 22 using equations (10) to (12), above. For calculation purposes, equation (10) is separated into several terms as follows:

Term 1 = POS1(E1 + E3*WGT)
Term 2 = POS2(E2 + E4*WGT)
WGT$_C$ = WGT + Term 1 + Term 2

Referring now to FIG. 22, the load shift compensation subroutine ADJFIN is entered at point 390. At block 391 a check is made to determine if the host is a calibration system. If so, no shift compensation is made and the program delays at block 392 before returning to the main loop to use the time that would have been spent in the shift compensation calculation and compensation. If, at block 391, the host is determined to be an application system, the program proceeds to the shift compensation procedure at point 393.

The shift (and linearity) compensation constants are read from RAM 62 at block 395. Then, at block 396 a check is made to ensure that the stored constants have not changed since being loaded. If any constant is deemed invalid the program returns to the main loop. If all the constants are valid, Term 1 of the shift compensation algorithm is calculated and stored at block 398 and Term 2 is calculated and stored at block 399. At block 400, the position-corrected weight WGT$_C$ is calculated and stored. The linearity correction factor, L, is calculated and stored at block 401. Finally, at block 405 WGT$_{CL}$, the weight corrected for load position and linearity, is calculated as the product of WGT and L and the program returns to the main loop.

Figure 24B:
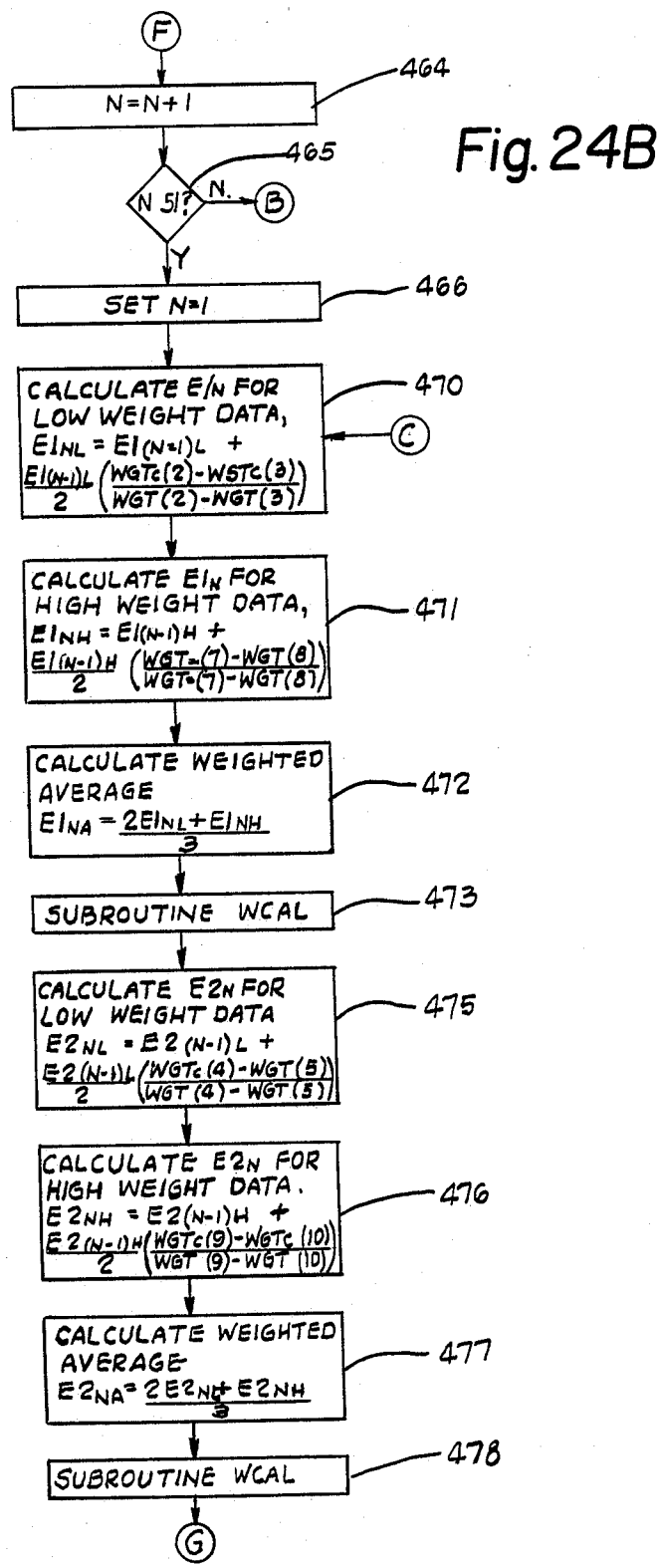
Figure 24C:
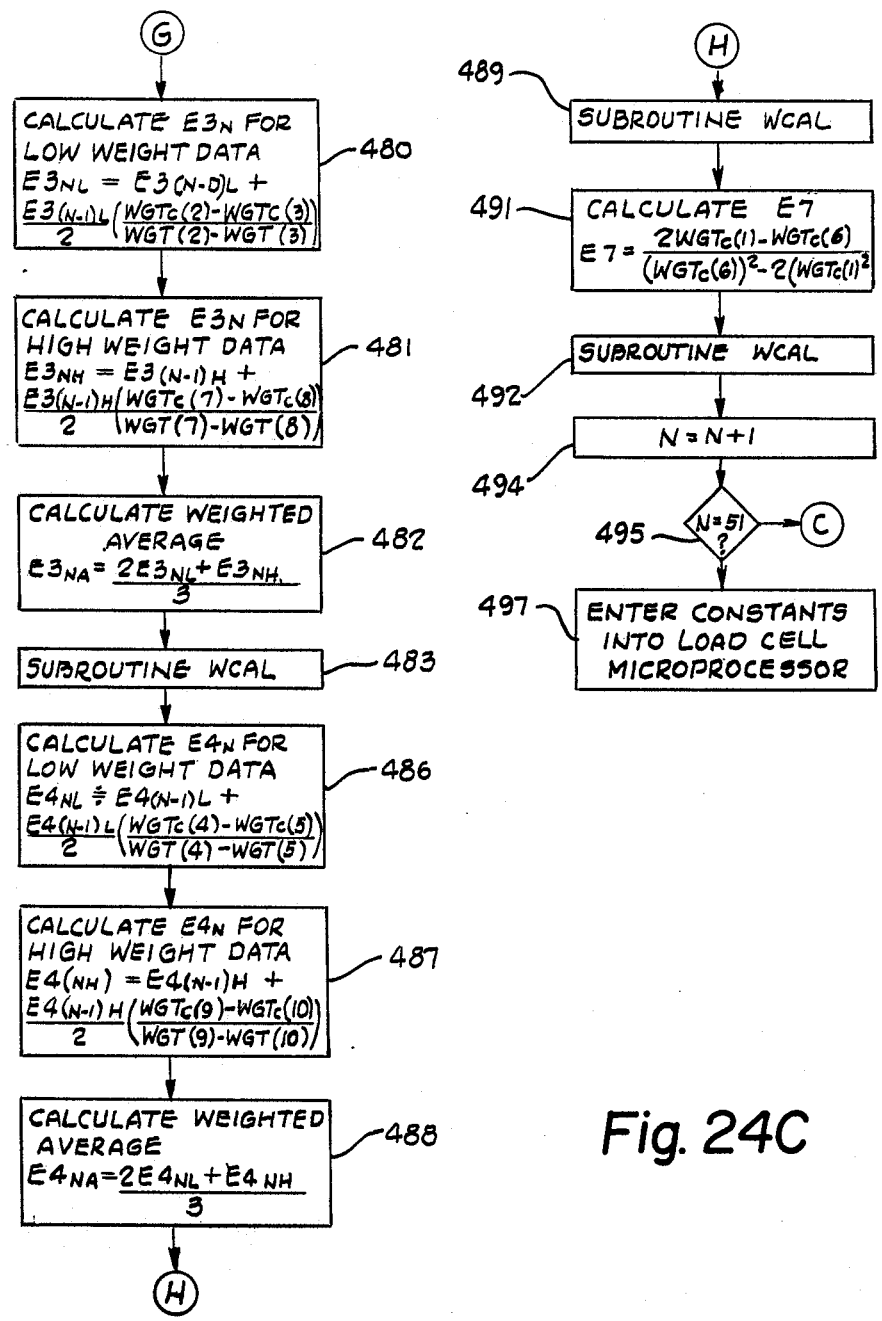

As mentioned above, the constants E1 to E4 and E7 (and E5, E6 and E8 if used) in equations (10) to (12) above are predetermined for each load cell apparatus 60 and stored for use in load position and linearity compensation. The load cell platter diagram of FIG. 23 and the flow chart of FIGS. 24A to 24C illustrate a process for determining constants E1 to E4 and E7.

Referring now to FIG. 23, there is shown a load receiving platter 415 supported by the dual beam load cell counterforce 115 of FIG. 8. With the load cell 115 and platter 415 as part of the system of FIG. 2, data needed for calculation of constants E1 to E4 and E7 are obtained by taking a number of weight readings with known weights at various positions on platter 415. The different values of J at the same position on platter 415 (e.g., J = 1, 6) represent different weights at that position. Known weights are placed at each weight-position J on platter 415 and readings of WGT, POS1 and POS2 are taken for each weight and position. Specifically, a known weight of, for example, one-half the scale capacity is placed at center position 1 and the readings are taken. The same weight is then moved to position 2 and then position 3, providing longitudinal displacements of the weight, and the same readings are taken. The same weight is then moved to position 4 and then position 5, providing transverse weight displacements, and the same readings are taken for each of those positions. A known weight corresponding to the full capacity of the scale is then placed at each of the same positions (J = 6 to 10) in turn and WGT, POS1 and POS2 readings are obtained for each of those platter positions.

The resulting data produces ten equations (J = 1 to 10) in the form of equations (10) and (12) above. Equations 1 to 5 were obtained with the weight of half capacity and equations 6 to 10 with the weight of full scale capacity at the same respective platter positions. Equations 1 and 6 utilize readings obtained with the two different weights positioned at the center of platter 415. Similarly, equations 2 and 7 and equations 3 and 8 utilize readings at the same two longitudinally displaced weight positions. Equations 4 and 9 and equations 5 and 10, respectively, utilize readings at the same two transversely displaced weight positions. In the ten equations thus obtained the quantities to be determined are constants E1 to E4 and E7. Constants E1 and E3 in each equation affect the longitudinal position indication POS1 while constants E2 and E4 affect the transverse position indication POS2.

Referring now to the flow charts of FIGS. 24 and 25, initially, at block 430, the readings described above of weight and position information are taken for each of the ten positions identified in FIG. 23. At block 431 the data is normalized, if necessary, by subtracting a no-load reading from each of the readings taken at block 430.

Then, at block 434 an initial value for the constant E1 is calculated as the ratio of the difference in weight readings between longitudinal positions 2 and 3 in FIG. 23 to the difference in longitudinal position sensor readings for positions 2 and 3. An initial value for constant E2 is calculated at block 436 as the ratio of the difference between the weight readings at transverse positions 4 and 5 to the difference between transverse position sensor readings at those same positions. The program then jumps at block 438 to subroutine WCAL in which equations (10) and (12) are employed with the initial values of E1 and E2 to calculate $WGT_C(J)$ and $WGT_{CL}(J)$ for each weight-position J on platter 415 in FIG. 23.

At blocks 440 to 445 the program performs an iterative loop of, in this example, 50 repetitions in which the constant E1 is modified, the subroutine WCAL is used to calculate new values of $WGT_C(J)$ and $WGT_{CL}(J)$, the constant E2 is modified, the subroutine WCAL utilized again and the entire process repeated 50 times. Prior to entering the iterative loop the repetition counter N is initialized at block 439. At block 440 constant E1 is modified at each repetition by algebraically adding to the initial or the previously calculated value a fraction of that value. The fraction added is determined by the ratio of the difference between the corrected weights obtained from equations 2 and 3 ($WGT_C(2)$ and $WGT_C(3)$) in the most recent execution of subroutine WCAL to the weight readings used in equations 2 and 3 (WGT(2) and WGT(3)) in the same execution of subroutine WCAL. Then, at block 441 subroutine WCAL is repeated using the most recently obtained value of $E1_N$. The value of constant E2 is modified at block 442 at each repetition by adding to the initial or the previously calculated value a fraction of that value determined by the ratio of the difference between the corrected weights obtained from equations 4 and 5 in block 441 to the difference between the weight readings used in equations 4 and 5 in block 441. Subroutine WCAL is repeated at block 443 using the most recently obtained value of $E2_N$.

When the 50 iterations are completed as determined at block 445, the program proceeds to blocks 450 and 451 where initial values are calculated for the constants E3 and E4 from the equations set forth in the respective blocks. At blocks 455 to 465 the program performs another iterative loop similar to that described above in blocks 440 to 445 but involving constants E3 and E4 as well as E1 and E2. After repetition counter N is initialized at block 452 constants E1 and E2 are modified and subroutine WCAL performed at blocks 455, 456, 457 and 459 in the same manner as described above. At block 460 the constant E3 is modified by adding to the initial or the previously calculated value a fraction of that value determined by the ratio of the difference between the corrected weights obtained from equations 7 and 8 to the weight readings used in equations 7 and 8 in subroutine WCAL at block 459. After each calculation at block 460 subroutine WCAL is executed at block 461. Then, at block 462 the value of constant E4 is modified by adding to the previously calculated value a fraction of that value determined by the ratio of the difference between the corrected weights obtained in block 461 from equations 9 and 10 to the difference in the weight readings used in equations 9 and 10. Subroutine WCAL is again executed at block 463 and if 50 repetitions have not been completed the program returns to block 455 to begin another iteration. The iterations continue until 50 repetitions have been completed as determined at block 465.

The program executes another iterative loop at blocks 470 to 493. In this loop the values of constants E1 to E4 as thus far calculated in the program are adjusted for different weight data, a half capacity weight having been used for equations and weight-positions 1 to 5 while a full capacity weight was used in equations and weight-positions 6 to 10. To this point in the program, constants E1 and E2 have been calculated and modified using half weight capacity data only, while constants E3 and E4 have been calculated and modified using full weight capacity data only.

After repetition counter N is initialized at block 466, the most recently obtained value of the constant E1 is again modified at block 470 in the same manner as before using half capacity or "low weight" information, specifically readings and calculations for weight-positions and equations 2 and 3. Then, at block 471, the most recent value of E1 (obtained at block 455) is modified using full capacity or "high weight" information, specifically readings and calculations for equations and weight-positions 7 and 8. A weighted average is then calculated at block 472 of the "low weight" E1 from block 470 and the "high weight" E1 from block 471. In that calculation the "low weight" E1 is given twice the calculation weight of the "high weight" E1 because half and full capacity weights were used in generating the respective low and high weight information. At block 473, subroutine WCAL is again executed to calculate $WGT_C(J)$ and $WGT_{CL}(J)$ using the weighted average of E1 obtained at block 472.

At blocks 475 to 478, the steps executed for the constant E1 at blocks 470 to 473 are executed for the constant E2. At block 475, E2 is calculated using "low weight" information and at block 476 is calculated using "high weight" information. A weighted average of the "low weight" and "high weight" E2 is then calculated at block 477 in the same manner as described above for the constant E1. At block 478 subroutine WCAL is again executed to calculate $WGT_C(J)$ and $WGT_{CL}(J)$ using the weighted averages of E1 and E2.

Blocks 480 to 483 repeat for constant E3 the steps described above at blocks 470 to 479 for constants E1 and E2. The subroutine WCAL is executed at block 483 using the weighted averages of constants E1, E2 and E3.

At blocks 486 to 489 the steps described above for obtaining weighted averages of E1, E2 and E3 are repeated for constant E4. A weighted average of E4 is obtained at block 488 from the "low weight" value of E4 obtained at block 486 and the "high weight" value obtained at block 487. Subroutine WCAL is again executed at block 489 using the weighted averages for constants E1 to E4.

A value for the constant E7 is calculated at block 491 for the first time using values of corrected weight, $WGT_C$, obtained at block 489 from equations 1 and 6. These equations utilize data from weight-positions 1 and 6, which are center load positions at half and full capacity, respectively, in FIG. 23. The calculated value $WGT_C(1)$ must be doubled in the calculation of E7 since it involves only one-half the weight in the value of $WGT_C(6)$. Subroutine WCAL is executed at block 492 using the value of E7 calculated at block 491.

As indicated at blocks 494 and 495, the entire loop from block 470 to block 495 is repeated until 50 repetitions have been performed which is deemed sufficient to obtain accurate values for constants E1 to E4 and E7. At block 497, those constants are entered into the load cell microprocessor 60 in FIG. 2 for use, with the load shift and linearity correction algorithms, in load shift and linearity corrections during operation of the weighing apparatus.

As mentioned above, it may sometimes be desirable to use the complete form of equations (10) to (12) above in which constants E5, E6 and E8 are not equal to zero and must be calculated. In that event, additional data readings would be needed from weights positioned on platter 415 in FIG. 23. Such readings might be taken with weights positioned midway between position 1, 6 and position 2, 7 and midway between position 1, 6 and position 3, 8 to obtain additional longitudinal displacement data. Weights positioned midway between position 1, 6 and position 4, 9 and midway between position 1, 6 and position 5, 10 could be used to obtain additional transverse displacement data. In the program of FIGS. 24A to 24C, initial values for constants E5 and E6 would be introduced after blocks 465 in FIG. 24B. The procedure after that would be analogous to the procedure described above, with the additional constants E5 and E6 being treated in the same manner as constants E1 to E4. The initial calculation of constant E8 would be introduced after block 492 in FIG. 24C and would be followed immediately by another execution of subroutine WCAL.

Programs analogous to those illustrated in FIGS. 21 and 22 and 23 to 24C can be used for load shift and linearity correction and for calculation of correction algorithm constants, respectively, for essentially any types of load cell counterforce and sensors, including the load cell with capacitive sensors described above and shown in FIGS. 12 to 20.

What is claimed is:

1. Weighing apparatus compensated for load position comprising a counterforce, transducer means on said counterforce for producing outputs representing the magnitudes of loads applied to said counterforce, load position sensing means mounted on said counterforce to produce outputs representing the positions in at least one of two mutually transverse directions of loads applied to said counterforce, means for storing a mathematical expression for load compensated for load position as a function of load position and magnitude, and means for utilizing said expression and said load position outputs and said load magnitude outputs to provide load indications independent of the positions in at least said one direction of the loads applied to said counterforce.

2. Apparatus as claimed in claim 1 wherein said load position sensing means includes first and second sensing means for producing outputs representing load positions in two mutually transverse directions.

3. Apparatus as claimed in claim 2 wherein said expression is of the form $$CR = A*RR + B*LG + C*TG,$$

where
CR is the corrected weight
RR is the uncorrected weight
LG and TG are the outputs of the position sensing means, and
A, B, and C are constants having values determined for the particular weighing apparatus.

4. Apparatus as claimed in claim 1 wherein said mathematical expression includes one or more constants determined for the particular weighing apparatus.

5. Apparatus as claimed in claim 1 wherein said counterforce includes at least one member movable in proportion to loads applied to the counterforce, and said transducer means includes means mounted on said movable member responsive to movement of the movable member for providing an indication of the magnitude of the load applied to said counterforce.

6. Apparatus as claimed in claim 1 wherein said counterforce includes a pair of members relatively movable in response to loads applied to the counterforce, and wherein said load position sensing means includes at least one capacitor having a plate mounted on each of said relatively movable members.

7. Weighing apparatus as claimed in claim 6 wherein said relatively movable members include cantilever beams extending parallel to the longitudinal axis of said counterforce.

8. Weighing apparatus as claimed in claim 1 wherein said counterforce includes a pair of members relatively movable in response to loads applied to the counterforce, and wherein said transducer means includes a capacitor having a plate mounted on each of said relatively movable members.

9. Apparatus as claimed in claim 1 wherein said counterforce includes at least one beam member and said transducer means includes at least one strain gage mounted on said beam member to provide an output indicating the magnitude of loads applied to said beam member.

10. Apparatus as claimed in claim 9 wherein said position sensing means includes a first strain gage positioned on a surface of said beam to detect displacement of a load in a direction parallel to the longitudinal axis of said beam and a second strain gage positioned on a surface of the beam to detect displacement of a load in a direction transverse to the longitudinal axis of the beam.

11. Apparatus as claimed in claim 9 wherein said counterforce includes first and second parallel beams and means connecting said beams rigidly together at both ends to form a parallelogram structure.

12. Apparatus as claimed in claim 11 wherein all of said strain gages are mounted on the outer surface of one of said beams, and including means for calculating a load indication compensated for both load position and linearity of the load indication with changing magnitude of the load.

13. Apparatus as claimed in claim 1 wherein said transducer means includes strain gages mounted on said counterforce.

14. Apparatus as claimed in claim 1 including a term in said mathematical expression correcting for nonlinearities in the output of said transducer means, and wherein said means for utilizing said expression provides load indications corrected for said nonlinearities.

15. A method of load shift compensating a digital weighing scale having a load cell for producing a signal representing the magnitude of weights applied to the scale, means for converting said signal to a digital indication of weight and means for displaying said digital weight indication, comprising the steps of providing weight position sensing means on said load cell to produce signals representing the position of the weight in at least one of two mutually transverse directions, developing a mathematical expression for weight corrected for position as a function of the weight magnitude and position, and storing said expression for use in determining a weight indication corrected for position.

16. A method as claimed in claim 15 further comprising the step of including in said mathematical expression a term correcting for nonlinearities in said weight magnitude signal, and storing said expression for determining a weight indication corrected for both position and nonlinearity.

17. A method as claimed in claim 15 including the step of providing first and second weight position sensing means to produce signals representing the position of the weight in two mutually transverse directions.

18. A method of making a compensated weighing scale comprising the steps of providing a counterforce, mounting force transducer means thereon to provide an output representing the magnitude of loads applied to the counterforce, mounting position sensing means on said counterforce to provide output information representing the positions in at least one of two mutually transverse directions of loads applied to the counterforce, determining the response of said force transducer and said position sensing means to loads applied off-center on said counterforce, utilizing said responses to develop an expression for load corrected for the effects of off-center loading of the counterforce as a function of said load magnitude and position information, and storing said expression for use in calculating said corrected load.

19. A method as claimed in claim 18 further comprising the step of including in said expression a term correcting for nonlinearity in the output of said transducer means.

20. A method as claimed in claim 18 wherein said mathematical expression for corrected load includes one or more constants, and including the steps of determining the values of the constants for the particular weighing scale and storing said values for use in calculating corrected loads.

21. A method as claimed in claim 20 wherein the values of said constants are determined by positioning known loads at different locations on said counterforce, determining the responses of said force tranducer means and said position sensing means to said weights and using said responses and said expessions to determine the value of the constants.

* * * * *